Figure 1:
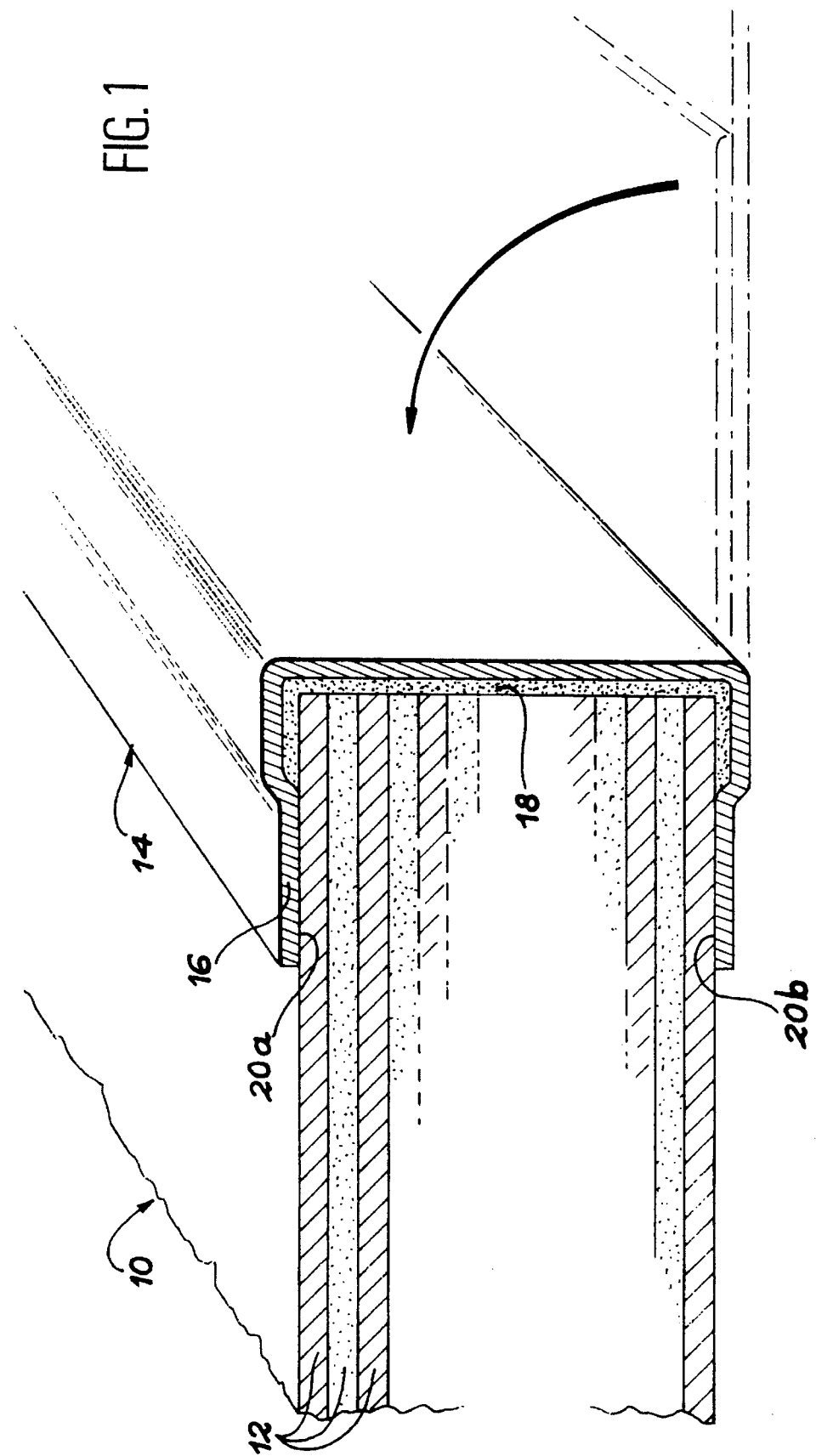

United States Patent [19]
Mauduit et al.

[11] Patent Number: 5,527,420
[45] Date of Patent: Jun. 18, 1996

[54] MACHINE FOR BONDING AN ADHESIVE PROTECTIVE EDGING ON THE EDGE OF A MULTILAYER PANEL SUCH AS A SPACECRAFT HEAT SHIELD

[75] Inventors: Daniel A. Mauduit, St. Aygulf; Gérard Sisani, Cannes La Bocca, both of France

[73] Assignee: Aerospatiale Societe Nationale Industrielle, France

[21] Appl. No.: 477,990

[22] Filed: Jun. 7, 1995

Related U.S. Application Data

[62] Division of Ser. No. 210,304, Mar. 17, 1994, Pat. No. 5,514,238.

[30] Foreign Application Priority Data

Mar. 31, 1993 [FR] France ................. 93 03745

[51] Int. Cl.⁶ .................................................. B32B 31/10
[52] U.S. Cl. .................... 156/465; 156/201; 156/216; 156/289; 156/463; 156/464; 156/468; 156/477.1; 156/479
[58] Field of Search ...................... 156/461, 464, 156/463, 465, 468, 477.1, 479, 200, 201, 202, 216, 289; 493/436, 437, 442, 417; 270/41

[56] References Cited

U.S. PATENT DOCUMENTS

| | | | |
|---|---|---|---|
| 4,750,966 | 6/1988 | Koller | 156/202 |
| 5,087,310 | 2/1992 | Robinette | 156/202 |
| 5,439,549 | 8/1995 | Frye et al. | 156/201 |

*Primary Examiner*—Michele K. Yoder
*Attorney, Agent, or Firm*—Hayes, Soloway, Hennessey, Grossman & Hage

[57] ABSTRACT

The protection of the straight edges of multilayer panels (10), such as spacecraft thermal protection panels or heat shields, is ensured by an adhesive protection edging (14) having two adhesive, lateral zones bonded to the faces of the panel and a non-adhesive zone (18) placed on the edge of the panel. Following the removal of a non-adhesive protection (30b), a first adhesive, lateral zone (20b) is brought onto a working plane (22), through a slot (32), and is progressively bonded to the lower face of a panel (10) moving on said plane. The second lateral, adhesive zone is then turned down and pressed onto the upper face of the panel, after which the non-adhesive protection (30a) of said zone is removed.

9 Claims, 3 Drawing Sheets

MACHINE FOR BONDING AN ADHESIVE PROTECTIVE EDGING ON THE EDGE OF A MULTILAYER PANEL SUCH AS A SPACECRAFT HEAT SHIELD

This is a divisional of application Ser. No. 08/210,304, filed on Mar. 17, 1994, now U.S. Pat. No. 5,514,238.

DESCRIPTION

The invention relates to a process making it possible to bond an adhesive protective edging to a straight edge of a multilayer panel such as a panel to be used as the thermal protection of a spacecraft (satellite, orbiting station, etc.). The invention also relates to a machine performing this process.

The sensitive parts of spacecraft such as satellites or orbiting stations are usually covered with multilayer heat protection blankets or panels. These panels protect the aforementioned sensitive parts against the extreme temperature variations to which they are exposed, depending on whether or not they are oriented towards the sun. Such heat protection panels are normally referred to as "superinsulation". They are formed from a stack of extremely thin sheets usually made from plastic materials such as MILAN, KAPTON or DACRON (registered trademarks), which may or may not be metallized. The number of layers is dependent on the thermal protection which it is wished to obtain.

Bearing in mind the nature of certain of the materials located within the stack forming such a multilayer panel, it is essential to protect the edge of the panel, so that it is not exposed directly to the vacuum or solar radiation. Thus, such an exposure would have the effect of rapidly disintegrating certain materials, which would immediately render inoperative the optical systems carried on the craft. This is clearly not admissible, bearing in mind the cost of spacecraft.

It is also important that the protection of the edge of the panel is brought about without creating heat bridges between the different sheets forming it, because otherwise there would be a significant reduction in the effectiveness of the thermal protection.

The protection of the edge of multilayer panels of this type is normally obtained by bonding along each of the edges of said panel an adhesive protective edging. More specifically, said adhesive protective edging is formed from a very wide adhesive strip, in the centre of which is bonded a central, non-adhesive strip. Thus, two lateral, adhesive zones are defined, which extend over the entire width of the edging and which are intended to be bonded to the opposite faces of the panel along the edge in question. The central, non-adhesive strip is intended to be positioned facing the panel edge. The thus formed adhesive protective edging is stored in wound form, each of the two lateral, adhesive zones being covered by an anti-adhesion protector.

In the present state of the art, a first anti-adhesive protector is removed and then the corresponding lateral, adhesive zone is manually bonded to the panel. The latter is then turned round and the second anti-adhesive protector is in turn removed in order to permit the bonding of the corresponding lateral, adhesive zone of the protective edging on the other face of the panel.

In order to avoid the creation of heat bridges between the different sheets of the panel, it is essential that the bonding of the protective edging is carried out without forming creases on the edges of said sheets. This is very difficult to obtain manually, due to the very limited thickness of the sheets forming the panels and the presence of static electricity in these sheets, bearing in mind the materials from which they are formed. Thus, when the second lateral, adhesive zone of the protective edging is folded onto the panel, the different sheets forming the latter tend to be attracted by said zone and are bonded thereto in an unsatisfactory position. In order that the bonding is satisfactory, it is therefore necessary to cut the protective edging into portions of limited length (always less than 100 mm, e.g. approximately 50 mm) and then successively put them into place along the panel edge.)

The manual bonding of the protective edging on the edges of the multilayer panels is consequently a long and tedious operation, whose cost is high, because in itself this represents approximately 50 to 80% of the cost of the finished panel, as a function of the shape complexity.

As illustrated by FR-A-2 618 771, it is known to bond a perforated, auto-adhesive reinforcing strip along the edge of a sheet of paper to one face of the said sheet, by means of a placing apparatus facilitating the relative positioning between the reinforcing strip and the sheet. However, the apparatus described in this document does not make it possible to solve the problem caused by the bonding of an adhesive protective edging to the two faces of a multilayer panel, along the edge of said panel.

The invention specifically relates to a process making it possible to bond an adhesive protective edging to the straight edge of a multilayer panel such as a spacecraft heat protection panel and over a virtually unlimited length, without any risk of creating heat ridges within the panel and in a particularly simple and inexpensive manner.

According to the invention, this result is obtained by means of a process for bonding an adhesive protective edging to a straight edge of a multilayer panel, characterized in that it comprises the following stages:

bonding a first lateral, adhesive zone of the edging to a first face of the panel, along the straight edge, by depositing said first face of the panel on a working plane, unwinding the edging from a storage reel, removing a first anti-adhesive protector covering the first lateral, adhesive zone, bringing the latter between the working plane and the first face of the panel, so that it is in contact with said first face along the straight edge of the panel and simultaneous advance of the panel and the first lateral, adhesive zone on the working plane, application of a pressure to the panel along the straight edge, bending the edging in such a way that a second adhesive, lateral zone of the latter, covered with a second anti-adhesive protector, is bent onto the opposite face of the panel and removing the second anti-adhesive protector whilst maintaining a pressure on the panel, along the straight edge.

In this process, in view of the fact that the first lateral, adhesive zone of the protective edging is bonded to the first face of the panel by making the latter advance in the direction defined by its straight edge, the bonding of said first lateral, adhesive zone takes place without any difficulty, no matter what its length. Moreover, in view of the fact that the adhesive protective edging is folded or bent onto the panel whilst a pressure is applied thereto and the anti-adhesive protector covering the second lateral, adhesive zone of the edging has not as yet been removed, the bonding of said second zone is also carried out without difficulty, no matter what its length, during the progressive removal of the second anti-adhesive protector.

Advantageously, the straight edge of the panel is guided during its advance on the working plane. In a first embodiment of the invention, the bending or folding of the edging is carried out after cutting its ends, the panel then being stationary on the working plane.

However, according to a second embodiment of the invention, the bending or folding of the edging takes place progressively during the advance of the panel on the working plane, following the bonding of the first lateral, adhesive zone and before cutting the ends of the edging.

The invention also relates to a machine for bonding an adhesive protection edging to a straight edge of a multilayer panel, characterized in that it comprises:

a working plane able to receive the panel, a reel for storing the adhesive protective edging, placed below the working plane, a means for removing a first anti-adhesive protector covering a first lateral, adhesive zone of the edging on leaving the storage reel, a slit formed in the working plane, for the passage of the first lateral zone on the working plane, at a location below a first face of the panel, along the straight edge, means for applying pressure to the panel resting on the working plane, along the straight edge, means for bending the edging on the opposite face of the panel and a means for removing a second anti-adhesive protector covering a second, lateral, adhesive zone of the edging.

In the first embodiment of the invention, the means for bending or folding the edging comprise a bending hinge articulated on the working plane, downstream of said slit. The pressure application means then comprise a rule which can be placed on the panel along its straight edge and in front of the bending hinge.

In the second embodiment of the invention, the edging bending means comprise a bending guide fixed to the working plane, so as to ensure a progressive bending of the edging during its advance on the working plane. The bending means also include a bending roller, which presses the second lateral, adhesive zone of the edging against the opposite face of the panel, downstream of the bending guide and upstream of the means for removing the second anti-adhesive protector.

In the latter case, the machine also has a bonding roller, which presses the second lateral, adhesive zone of the edging against the opposite face of the panel, downstream of the means for removing the second anti-adhesive protector. Cutting means are then placed downstream of the bonding roller.

In the second embodiment of the invention, the pressure application means advantageously comprise a pressing shoe or block placed above the working plane, along the straight edge of the panel and extending downstream into the vicinity of a downstream end of the bending guide.

The invention is described in greater detail hereinafter relative to two non-limitative embodiments and with reference to the attached drawings, wherein show:

FIG. 1 A part sectional, perspective view of a straight edge of a multilayer panel such as a spacecraft thermal protection panel coated with an adhesive protection edging.

Figure 2:
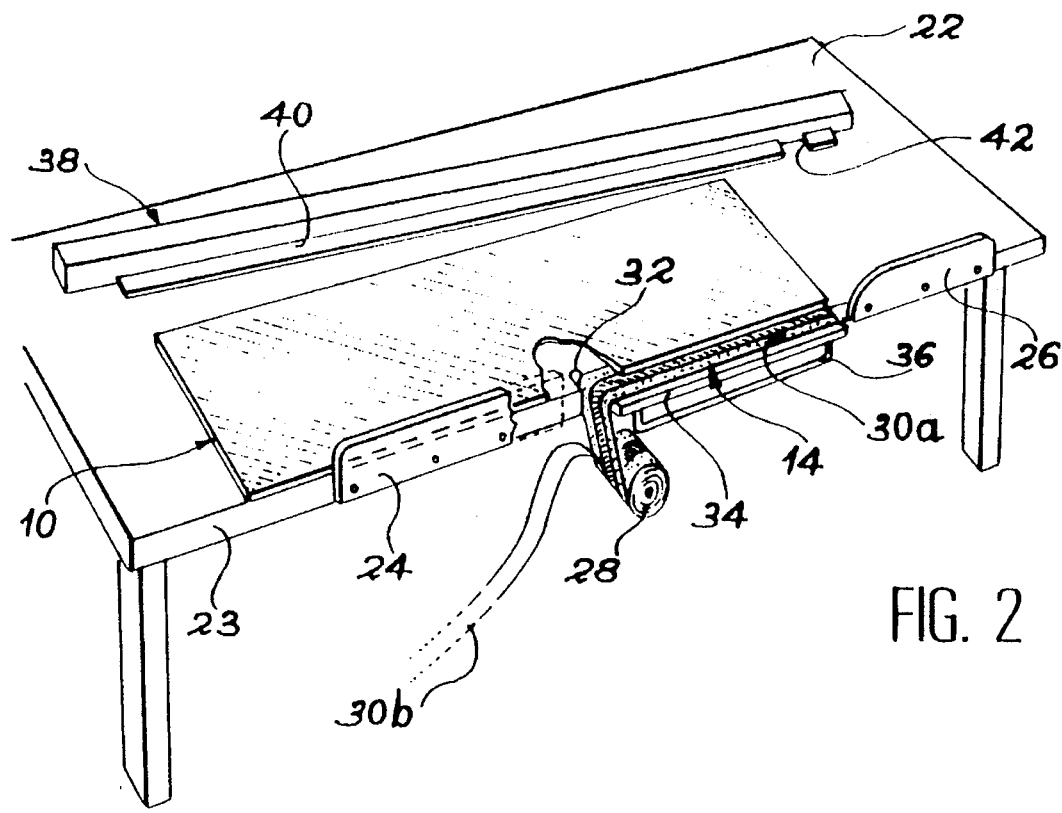

FIG. 2 A perspective view illustrating a first phase of the utilization of a machine according to the invention, during the bonding of a protective edging to the straight edge of a panel like that of FIG. 1.

Figure 3:
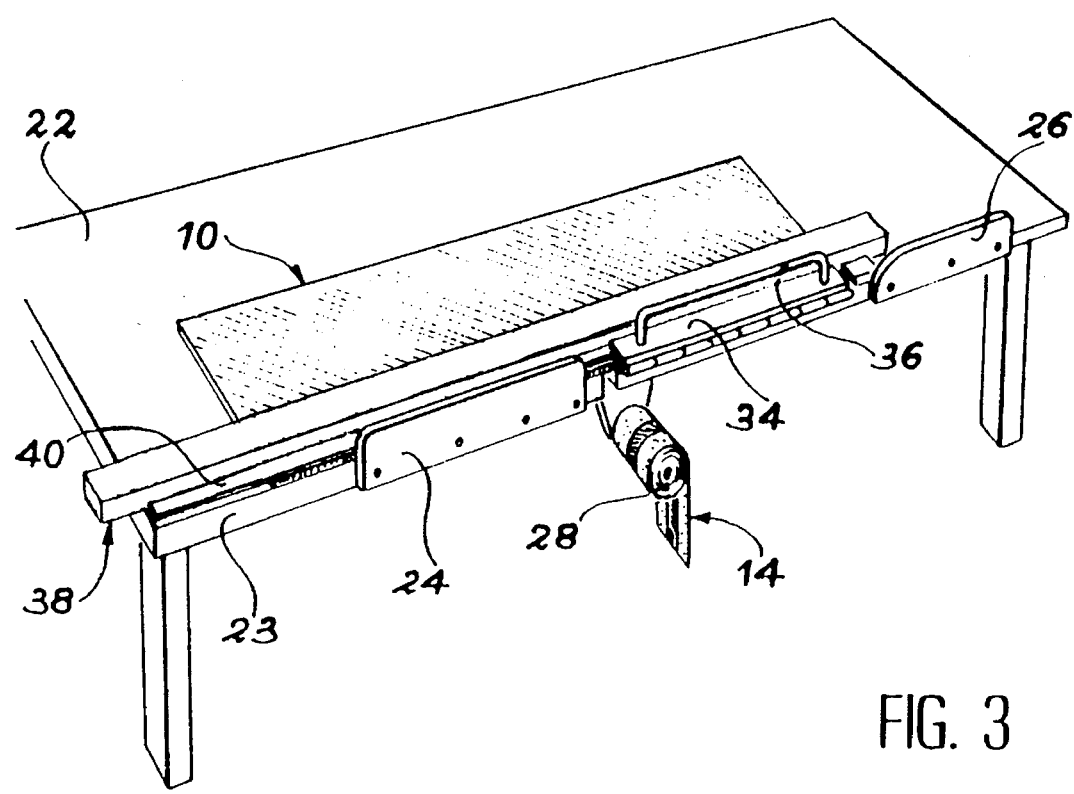

FIG. 3 A perspective view illustrating a second phase of the utilization of the machine of FIG. 2.

Figure 4:
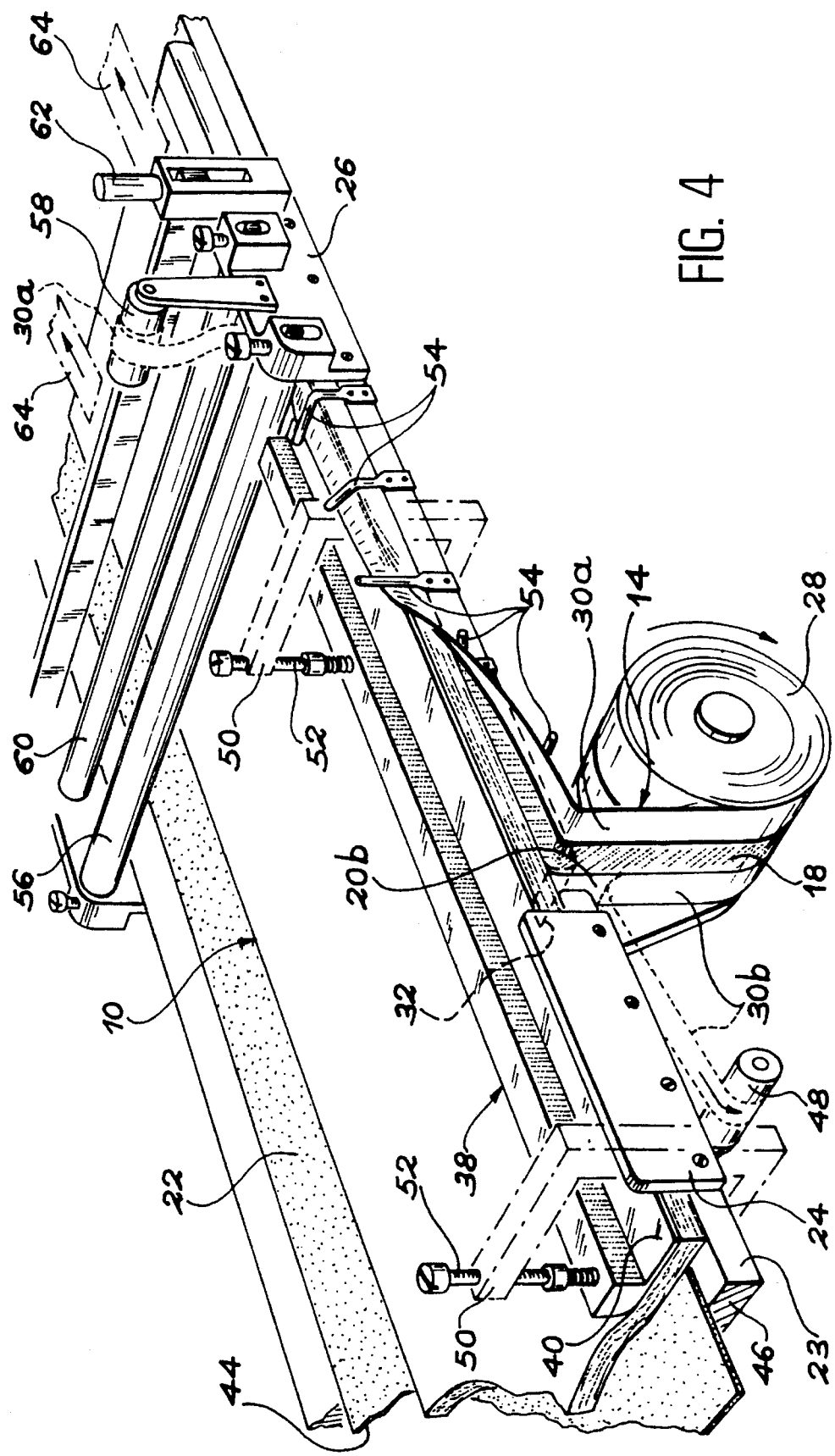

FIG. 4 A perspective view showing a second embodiment of a bonding machine according to the invention.

In FIG. 1, reference numeral 10 designates in general terms a multilayer panel constituted by a stack of very thin sheets 12. When the panel 10 is a superinsulation panel for providing the heat protection of certain sensitive parts of a spacecraft such as a satellite or orbiting station, the sheets 12 forming it can in particular be sheets of KAPTON (registered trademark) aluminized on at least one face, sheets of MYLAR (registered trademark) aluminized on both faces and sheets of DACRON (registered trademark) or glass cloth, arranged in alternating manner. The number of sheets varies as a function of the thermal insulation quality which it is wished to obtain and the nature of the materials used.

Bearing in mind the nature of the materials constituting certain of the sheets 12 of the stack, the exposure of these sheets to a vacuum and to solar radiation on the peripheral edge of the panel would lead to the rapid destruction of said sheets, at least in the peripheral region of the panel. This would lead to an efficiency loss on the part of the heat protection and in particular to an unacceptable pollution, which would rapidly render inoperative the optical systems carried on the craft. In order to avoid this risk, it is conventional practice to cover the edges of the panels 10 with an adhesive protective edging 14, as is diagrammatically illustrated in FIG. 1.

This adhesive protective edging 14 comprises an adhesive strip 16, whose width of e.g. 25 mm is much larger than the thickness of e.g. 4 to 5 mm of the panel 10, as well as a central, non-adhesive strip 18, whose width of e.g. 5 mm is equal to or slightly larger than the thickness of the panel 10. The adhesive strip 16 and the central, non-adhesive strip 18 can in particular be made from KAPTON (registered trademark). The central, non-adhesive strip 18 is bonded beforehand to the centre of the adhesive strip 16, so that the latter has two lateral, adhesive zones 20a, 20b on either side of the central, non-adhesive zone constituted by the strip 18. These lateral, adhesive zones 20a, 20b are intended to be bonded to the opposite faces of the panel 10, along the straight edge of the latter which requires protection, as illustrated in FIG. 1.

As has already been stated, the putting into place of the adhesive protection edging 14 on the edges of the panels 10 has hitherto taken place manually. In view of the very limited thickness of the sheets 12 and the electrostatic nature of the materials forming certain of these sheets, the manual putting into place of the adhesive protection edging 14 constituted a long and difficult operation requiring the application of successive portions of very limited length (less than 100 mm). Thus, the application of longer adhesive protection edgings would have led to wrinkling of the sheets 12 creating heat bridges, so that it would not be possible to obtain the desired heat protection.

According to the invention, the adhesive protection edging 14 is bonded to the straight edges of the panels, such as the panel 10, in such a way that an unlimited edging length can be deposited in one piece without leading to the formation of heat bridges.

A first machine making it possible to perform the bonding process of the invention will now be described relative to FIGS. 2 and 3. The machine illustrated in FIGS. 2 and 3 comprises a preferably horizontal working plane 22, whereof a straight edge 23 carries two guides 24, 26, which project upwards, respectively at the entrance and exit of the working plane.

The entrance guide 24 is located at the entrance end of the machine, on the left-hand side in FIGS. 2 and 3. It makes it possible to guide the straight edge of the panel 10 to be coated with the adhesive protective edging 14. This protective edging is wound onto a storage reel 28, whose horizontal shaft or spindle 30 is positioned below the working plane 22 and oriented in a direction orthogonal to the straight edge 23. On the reel 28, each of the adhesive, lateral zones 20a, 20b of the edging 14 is covered with an anti-adhesive protector 30a, 30b.

With respect to the straight edge 23 of the working plane 22, the reel 28 is positioned laterally in such a way that the lateral, adhesive zone 20b of the adhesive protection edging 14 is positioned below the working plane 22, whereas the rest of the adhesive protection edging 14 (i.e. the central, non-adhesive strip 18 and the other lateral, adhesive zone 20a) is positioned beyond the straight edge 23. In addition, the reel 28 is located below a slot 32 formed in the straight edge 23 of the working plane 22, just downstream of the guide 24 with respect to the introduction direction of the panel 10.

Taking account of the two characteristics described hereinbefore, the adhesive protection edging 14 can be unwound from the reel 28 through the slot 32, so that the lateral, adhesive zone 20b rests on the working plane 22 downstream of the slot 32, along the straight edge 23 of said plane, the adhesive face of said zone 20b then being turned upwards. Before the adhesive protection edging 14 is brought into this position, the anti-adhesive protector 30b covering the lateral, adhesive zone 20b is disengaged therefrom, below the working plane 22 and as illustrated in FIG. 2.

In that part of the working plane 22 located downstream of the slot 32 with respect to the introduction direction of the panel 10, a bending or folding hinge which is best visible in FIG. 3, is articulated on the edge 23 of the working plane 22, so as to be bent onto the latter, e.g. by acting on a handle 36. The bending hinge 34 extends forwards up to the exit guide 26.

The bonding machine illustrated in FIGS. 2 and 3 also comprises a rule 38, whose length is at least equal to that of the hinge 34 and preferably close to that of the working plane 22. On one of its sides the rule 38 has a pawl 40 of very limited thickness, which rests on the panel 10 placed on the working plane 22 and can be placed along the edge 23 of the latter. The thickness of the pawl 40 is sufficiently small for the hinge 34 to be then turned down onto the working plane 22, as illustrated in FIG. 3.

In the vicinity of its end which is to be turned towards the front of the machine, the pawl 40 of the rule 38 has a window 42 (FIG. 2), whose function will be described hereinafter.

The bonding of an adhesive protection edging 14 to a straight edge of a multilayer panel 10 with the aid of the machine described hereinbefore with reference to FIGS. 2 and 3 takes place in the following way.

With the rule 38 not placed on the useful part of the working plane 22, the operator deposits the panel 10 on the left-hand entrance end of the working plane, so that the straight edge to be coated with the adhesive protection edging 14 is placed along the straight edge 23 of the working plane and bears against the entrance guide 24. This putting into place occurs in such a way that the edge of the panel 10 turned towards the front of the machine, i.e. to the right on considering FIGS. 2 and 3, does not cover the slot 32 and is instead in the vicinity thereof.

The operator then unwinds a small length of adhesive protection edging 14 from the reel 28 through the slot 32, after having ensured the removal, below the working plane, of the anti-adhesive protector 30b covering the lateral, adhesive zone 20b. In order that said removal then takes place automatically during the unwinding of the adhesive protection edging, the end of the anti-adhesive protector 30b can be connected to a not shown tensioning system. Thus, unwinding takes place, above the working plane 22 and downstream of the slot 32, of a length of the adhesive protection edging 14 limited to a few centimeters. In order to maintain the tension of the adhesive protection edging on leaving the reel 28, its end located above the working plane 22 can also be connected to a tensioning system such as a counterweight.

When these preparatory operations are ended, the operator advances the panel 10 on the working plane 22 whilst maintaining the straight edge thereof to be protected in contact with the guide 24. As soon as the face of the panel 10 resting on the working plane 22 passes beyond the slot 32, the part of said face adjacent to the straight edge to be protected reaches the adhesive, lateral zone 20b of the protective edging 14 and is progressively bonded thereto, whilst entraining with it the edging 14, during its advance on the working plane 22.

In view of the fact that the panel 10 and the adhesive protection edging 14 advance simultaneously in the same direction on the working plane 22, bonding easily takes place in a progressive manner over a length which is not limited in this case other than by the length of the hinge 34. This operation can be performed manually, or with the aid of a panel traction mechanism not illustrated in the drawings. It continues until the leading edge of the panel 10 is flush with the front end of the hinge 34. This gives the position illustrated in FIG. 2.

The adhesive protection edging 14 is then cut in front of the slot 32 by any appropriate cutting system, so that that portion of the edging projecting beyond the edge of the panel 10 to be protected can be bent onto the upper face of the latter.

In order that said operation can be performed without any risk of the sheets forming the multilayer panel 10 forming creases leading to the creation of heat bridges, on said panel 10 and along its straight edge to be protected, is placed the rule 38, whilst the anti-adhesive protector 30a is still in place on the adhesive, lateral zone 20a of the protective edging 14. The position then occupied by the rule 38 is illustrated by lines in FIG. 3. In this position, the pawl 40 is placed along the straight edge 23 of the working plane.

The operator then bends the hinge 34 onto the pawl 40 using the handle 36. Therefore the adhesive protection edging 14 is preshaped in the position which it must finally occupy after bonding.

The operator then brings the hinge 34 into its initial, open position and disengages from the adhesive, lateral zone 20a of the protective edging 14 the end of the anti-adhesive protector 30a. More specifically, the operator folds said end substantially to 90° with respect to the straight edge 23 of the working plane 22 over a relatively small length, but which is still sufficient to ensure that the end of the protector projects slightly beyond the hinge 34 when the latter is again bent onto the upper face of the panel 10. The portion of the lateral, adhesive zone 20a of the protective edging 14 which is no longer covered with its anti-adhesive protector 30a is then positioned in front of the pawl window 42.

The hinge 34 is then bent onto the upper face of the panel 10 and onto the pawl 40, so that the portion of the lateral, adhesive zone 20a having no anti-adhesive protector is bonded to the panel 10 through the window 42 of the pawl 40. The rule 38 is then gently removed by the operator, whilst the hinge 34 remains bent in the manner illustrated in FIG. 3.

To complete the bonding operation, the operator only has to grasp the end of the anti-adhesive protector 30a projecting beyond the hinge 34 and pull on said end whilst pressing onto the hinge. The lateral, adhesive zone 20a is then progressively bonded to the upper face of the panel 10, without any parasitic creases being created in the sheets forming the said panel.

If the length of the straight edge of the panel 10 which is to be protected exceeds the length of the hinge 34, as is the case in FIGS. 2 and 3, the operation described hereinbefore can be repeated the necessary number of times until the entire panel edge is covered with a protective edging. However, it should be noted that the use of a hinge 34 longer than that illustrated in the drawings can make it possible to protect each of the edges of the presently used panels 10 in a single operation.

The bonding machine described hereinbefore with reference to FIGS. 2 and 3 requires manual interventions, so that it is only usable in connection with the manufacture of small numbers of multilayer panels. However, compared with the conventional bonding process, it already leads to essential advantages concerning the duration and cost of the operation.

With reference to FIG. 4, a description will now be given of a preferred embodiment of a bonding machine for performing the process according to the invention. This machine makes it possible to envisage the bonding of an adhesive protective edging in a substantially continuous manner on the straight edges of multilayer panels 10 positioned one after the other on the machine.

In the embodiment illustrated in FIG. 4, the working plane 22 is materialized by the upper face of a conveyor belt 44, which can travel on a horizontal table 46. The straight edge to be protected of each of the panels 10 placed on the conveyor belt 44 is positioned along the straight edge 23 of the table 46 and guided to the entrance and exit thereof by an entrance guide 24 and an exit guide 26.

As in the first embodiment described relative to FIGS. 2 and 3, the machine of FIG. 4 has a storage reel 28 onto which is wound the adhesive protective edging 14. The horizontal spindle of the reel 28 is orthogonal to the straight edge 23 of the table 46. This reel 28 is placed below the table 46 facing the slot 32 formed in the edge 23, so that the lateral, adhesive zone 20b of the protective edging 14 can be placed on the upper face of the table 46, along the edge 23, alongside the conveyor belt 44 and in front of the slot 32. The adhesive face of the lateral, adhesive zone 20b turned towards the upwards direction when it arrives on the upper face of the table 46, then loses its anti-adhesive protector 30b, which is detached from the edging 14 below the table 46 and is then e.g. rewound onto a mandrel 48.

The bonding machine illustrated in FIG. 4 also comprises a pressing block 38, which is permanently applied to the upper face of the panels 10 placed on the working plane 22 along the straight edge 23 of the table 46. In its portion closest to the edge 23, the pressing block 38 has a reduced thickness pawl 40. The pressing block 38 can be connected to the table 46 by brackets 50. A regulatable, elastic system 52 is advantageously provided between each of the brackets 50 and the pressing block 38, so as to be able to engage the latter on the upper face of the panels 10 with a substantially constant force, no matter what the thickness of said panels.

Downstream of the slot 32 with respect to the advance direction of the conveyor belt 44, the straight edge 23 of the table 46 carries a bending guide 54 making it possible to progressively bend down onto the pawl 40 that part of the adhesive protection edging 14 projecting beyond the edge 23, as the panels 10 and the protective edging 14 advance on the working plane 22. In the embodiment of FIG. 4, said bending guide incorporates pins 54. However, the bending guide could also assume any other configuration and in particular that of a continuous spout.

Immediately downstream of the bending guide 54 and the adjacent end of the pressing block 38, the bending of the adhesive protection edging 14 is completed by a pressing roller 56 supported by the exit guide 26. This horizontally axed pressing roller 56 is placed above the working plane 22 and positioned transversely with respect to the advance direction of the conveyor belt 44. It applies a controlled pressure to the upper face of each of the panels 10 travelling on the belt, as well as to that portion of the adhesive protection edging 14 folded onto said upper face by the folding guide 54. This pressure can advantageously be regulated, particularly to take account of the thickness of the panels 10.

Immediately downstream of the pressing roller 50 with respect to the advance direction of the conveyor belt 44, the exit guide 26 also supports, substantially above the working plane 22, a mandrel 58 onto which is wound the anti-adhesive protector 30a. It should be noted that said protector is only removed at this level and covers the lateral, adhesive zone 20a of the protective edging 14 folded onto the upper face of the panel 10 up to the pressing roller 56. In the same way as the mandrel 48 used for the winding up of the anti-adhesive protector 30b, the mandrel 58 can be driven by a motor.

Immediately downstream of the mandrel 58 used for removing the anti-adhesive protector 30a from the lateral, adhesive zone 20a of the protective edging 14, the bonding of said edging is completed by means of a bonding pressing roller 60 supported by the exit guide 26. This bonding pressing roller has essentially the same characteristics as the bending pressing roller 56, i.e. it is placed above the working plane 22, along a horizontal axis and is transversely oriented with respect to the advance direction of the conveyor belt 44, so as to apply a predetermined force to the upper face of the panels 10 and to that portion of the adhesive protective edging 14 turned down onto said face. When the panels 10 pass out of the pressing roller 60, the bonding of the adhesive protective edging 14 is completed.

Finally, downstream of the bonding pressing roller 60, the edge 23 of the table 46 supports a preferably motorized cutting device 62. The actuation of the cutting device 62 makes it possible to cut the adhesive protective edging 14 behind the trailing edge of a group of panels 10.

The starting of the machine according to FIG. 4 takes place in the same way as described relative to the machine of FIGS. 2 and 3. As soon as the lateral, adhesive zone 20b of the adhesive protective edging 14 starts to stick below the panel 10, the edging is moved with the panel by the conveyor belt 44. If necessary, tensioning strips such as 64 can be bonded to the front of each of the panels to ensure that the upper sheets of the panels do not bend when they pass below the pressing rollers 56, 60 or to ensure that the panels are not positioned slantwise during their advance on the machine. An identical system can be used for tensioning the front end of the adhesive protective edging 14.

The above description shows that the bonding process according to the invention can be performed in a more or less automated manner, as a function of the desired production rates. However, in all cases, this process makes it possible to bond adhesive protective edgings to virtually unlimited lengths without any risk of creating heat bridges within the panels. This leads to a considerable time and financial gain compared with the hitherto used procedures for performing the same operations.

We claim:

1. Machine for bonding an adhesive protection edging to a straight edge of a multilayer panel, said bonding machine comprising:

a working plane able to receive the panel, a reel for storing the adhesive protective edging, placed below the working plane, a means for removing a first anti-adhesive protector covering a first lateral, adhesive zone of the edging on leaving the storage reel, a slit formed in the working plane, for the passage of the first lateral adhesive zone on the working plane, at a location below a first face of the panel, along a straight edge of the panel, means for applying pressure to the panel resting on the working plane, along the straight edge of the panel, means for bending the edging onto the opposite face of the panel and a means positioned downstream from said bending means for removing a second anti-adhesive protector covering a second, later, adhesive zone of the edging.

2. Machine according to claim 1, further comprising a lateral guide against which is placed the straight edge of the panel upstream of the slot formed in the working plane.

3. Machine according to claim 1, wherein the edging bending means comprise a bending hinge articulated on the working plane downstream of said slot.

4. Machine according to claim 3, wherein the pressure application means comprise a rule which can be placed above the working plane in front of the bending hinge.

5. Machine according to claim 1, wherein the edging bending means comprise a bending guide fixed to the working plane so as to ensure a progressive bending of the edging during its advance on the working plane.

6. Machine according to claim 5, wherein the bending means also comprise a bending roller pressing the second lateral, adhesive zone of the edging against the opposite face of the panel downstream of the bending guide and upstream of a means for removing the second anti-adhesive protector.

7. Machine according to claim 6, comprising a bonding roller pressing the second lateral, adhesive zone of the edging against the opposite face of the panel downstream of the means for removing the second anti-adhesive protector.

8. Machine according to claim 7, wherein cutting means are positioned downstream of the bonding roller.

9. Machine according to claim 5, further comprising a pressure application means comprising a pressing block placed above the working plane, along the straight edge of the panel and extending downstream to the vicinity of a downstream end of the bending guide.

* * * * *